United States Patent
Lee et al.

(10) Patent No.: US 10,154,438 B2
(45) Date of Patent: Dec. 11, 2018

(54) METHOD AND APPARATUS FOR PERFORMING INTERWORKING BETWEEN 3GPP AND WLAN FOR DUAL CONNECTIVITY IN WIRELESS COMMUNICATION SYSTEM

(71) Applicant: LG ELECTRONICS INC., Seoul (KR)

(72) Inventors: Jaewook Lee, Seoul (KR); Youngdae Lee, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 12 days.

(21) Appl. No.: 15/327,632

(22) PCT Filed: Sep. 1, 2015

(86) PCT No.: PCT/KR2015/009196
§ 371 (c)(1),
(2) Date: Jan. 19, 2017

(87) PCT Pub. No.: WO2016/036113
PCT Pub. Date: Mar. 10, 2016

(65) Prior Publication Data
US 2017/0208501 A1 Jul. 20, 2017

Related U.S. Application Data (60) Provisional application No. 62/046,172, filed on Sep. 5, 2014.

(51) Int. Cl.
*H04W 28/08* (2009.01)
*H04W 48/18* (2009.01)
(Continued)

(52) U.S. Cl.
CPC ......... *H04W 28/085* (2013.01); *H04W 28/08* (2013.01); *H04W 48/18* (2013.01);
(Continued)

(58) Field of Classification Search
CPC ... H04W 28/085; H04W 48/18; H04W 28/08; H04W 88/06; H04W 36/0027; H04W 36/14; H04W 84/12; H04L 69/18
See application file for complete search history.

(56) References Cited

U.S. PATENT DOCUMENTS

| | | | |
|---|---|---|---|
| 2014/0204909 A1 | 7/2014 | Cheng et al. | |
| 2016/0205592 A1* | 7/2016 | Koskinen | H04W 28/08 370/230 |
| 2016/0269985 A1* | 9/2016 | Bergstrom | H04W 48/18 |

OTHER PUBLICATIONS

PCT International Application No. PCT/KR2015/009196, International Search Report dated Dec. 11, 2015, 3 pages.
(Continued)

*Primary Examiner* — Jackie Zuniga Abad
(74) *Attorney, Agent, or Firm* — Lee Hong Degerman Kang Waimey (57) ABSTRACT

A method and apparatus for performing traffic steering in a wireless communication system is provided. A user equipment (UE), which is connected to both a master evolved NodeB (MeNB) and a secondary eNB (SeNB) in dual connectivity, receives an indication which indicates whether traffic steering of bearers belonging to a specific bearer type is allowed or not, and performs traffic steering of bearers when traffic steering of bearers belonging to the specific bearer type is allowed.

7 Claims, 10 Drawing Sheets

(51) Int. Cl.
  *H04W 84/12*  (2009.01)
  *H04W 36/00*  (2009.01)
  *H04W 36/14*  (2009.01)
  *H04W 88/06*  (2009.01)

(52) U.S. Cl.
  CPC ........ *H04W 36/0027* (2013.01); *H04W 36/14* (2013.01); *H04W 84/12* (2013.01); *H04W 88/06* (2013.01)

(56) References Cited

OTHER PUBLICATIONS

Nadeem Akhtar, 'LTE-WLAN Interworking: 3GPP Release-12 Perspective', IEEE Standards Workshop on Last Mile connectivity, Bangalore, India, Jul. 31, 2013, 21 pages.

LG Electronics Inc., 'UP Radio Protocol for Dual Connnectivity', R2-131231, 3GPP TSG-RAN2 Meeting #81bis, Apr. 5, 2013, 9 pages.

3rd Generation Partnership Project (3GPP), "Technical Specification Group Radio Access Network; Study on Small Cell enhancements for E-UTRA and E-UTRAN; Higher layer aspects (Release 12)," 3GPP TR 36.842 V12.0.0, Dec. 2013, 72 pages.

3rd Generation Partnership Project (3GPP), "Technical Specification Group Services and system Aspects; 3GPP system to Wireless Local Area Network (WLAN) interworking; System description (Release 11)," 3GPP TS 23.234 V11.0.0, Sep. 2012, 85 pages.

3rd Generation Partnership Project (3GPP), "Technical Specification Group Radio Access Network; Evolved Universal Terrestrial Radio Access (E-UTRA); User Equipment (UE) procedures in idle mode (Release 12)," 3GPP TS 36.304 V12.0.0, Mar. 2014, 34 pages.

* cited by examiner

METHOD AND APPARATUS FOR PERFORMING INTERWORKING BETWEEN 3GPP AND WLAN FOR DUAL CONNECTIVITY IN WIRELESS COMMUNICATION SYSTEM

CROSS-REFERENCE TO RELATED APPLICATIONS

This application is the National Stage filing under 35 U.S.C. 371 of International Application No. PCT/KR2015/009196, filed on Sep. 1, 2015, which claims the benefit of U.S. Provisional Application No. 62/046,172, filed on Sep. 5, 2014, the contents of which are all hereby incorporated by reference herein in their entirety.

BACKGROUND OF THE INVENTION

Field of the Invention

The present invention relates to wireless communications, and more particularly, to a method and apparatus for performing interworking between 3rd generation partnership project (3GPP) and wireless local area network (WLAN) for dual connectivity in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission power is lower than macro node and base station (BS) classes, for example pico and femto evolved NodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

One of potential solutions for small cell enhancement, dual connectivity (DC) has been discussed. Dual connectivity is used to refer to operation where a given UE consumes radio resources provided by at least two different network points connected with non-ideal backhaul. Furthermore, each eNB involved in dual connectivity for a UE may assume different roles. Those roles do not necessarily depend on the eNB's power class and can vary among UEs.

3GPP/wireless local area network (WLAN) interworking has been discussed. 3GPP/WLAN interworking may be called traffic steering. From rel-8 of 3GPP LTE, access network discovery and selection functions (ANDSF) for detecting and selecting accessible access networks have been standardized while interworking with non-3GPP access (e.g., WLAN) is introduced. The ANDSF may carry detection information of access networks accessible in location of a user equipment (UE) (e.g., WLAN, WiMAX location information, etc.), inter-system mobility policies (ISMP) which is able to reflect inter-operator's policies, and inter-system routing policy (ISRP). Based on the information described above, the UE may determine which Internet protocol (IP) traffic is transmitted through which access network. The ISMP may include network selection rules for the UE to select one active access network connection (e.g., WLAN or 3GPP). The ISRP may include network selection rules for the UE to select one or more potential active access network connection (e.g., both WLAN and 3GPP). The ISRP may include multiple access connectivity (MAPCON), IP flow mobility (IFOM) and non-seamless WLAN offloading. Open mobile alliance (OMA) device management (DM) may be used for dynamic provision between the ANDSF and the UE.

UE operation related to traffic steering between 3GPP/WLAN needs to be defined clearly, when a plurality of serving cells is configured by CA or DC.

SUMMARY OF THE INVENTION

The present invention provides a method and apparatus for performing interworking between 3rd generation partnership project (3GPP) and wireless local area network (WLAN) for dual connectivity in a wireless communication system. The present invention provides a method and apparatus for permitting traffic steering per bearer type for dual connectivity.

In an aspect, a method for performing, by a user equipment (UE), traffic steering in a wireless communication system is provided. The method includes receiving an indication which indicates whether traffic steering of bearers belonging to a specific bearer type is allowed or not, and performing traffic steering of bearers when traffic steering of bearers belonging to the specific bearer type is allowed.

In another aspect, a user equipment (UE) includes a memory, a transceiver, and a processor coupled to the memory and the transceiver, and configured to control the transceiver to receive an indication which indicates whether traffic steering of bearers belonging to a specific bearer type is allowed or not, and perform traffic steering of bearers when traffic steering of bearers belonging to the specific bearer type is allowed.

Traffic steering can be performed per bearer type for dual connectivity.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
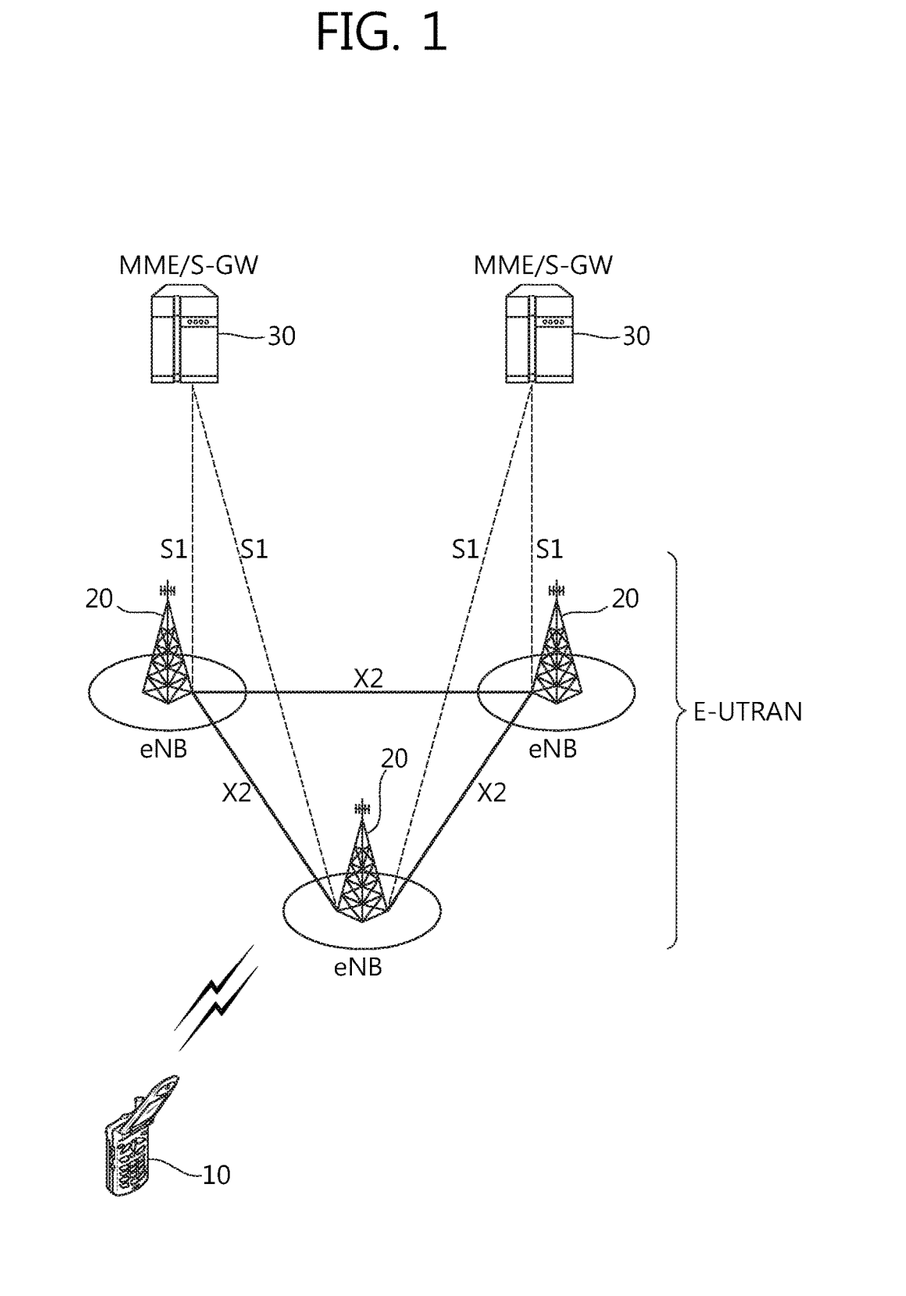
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
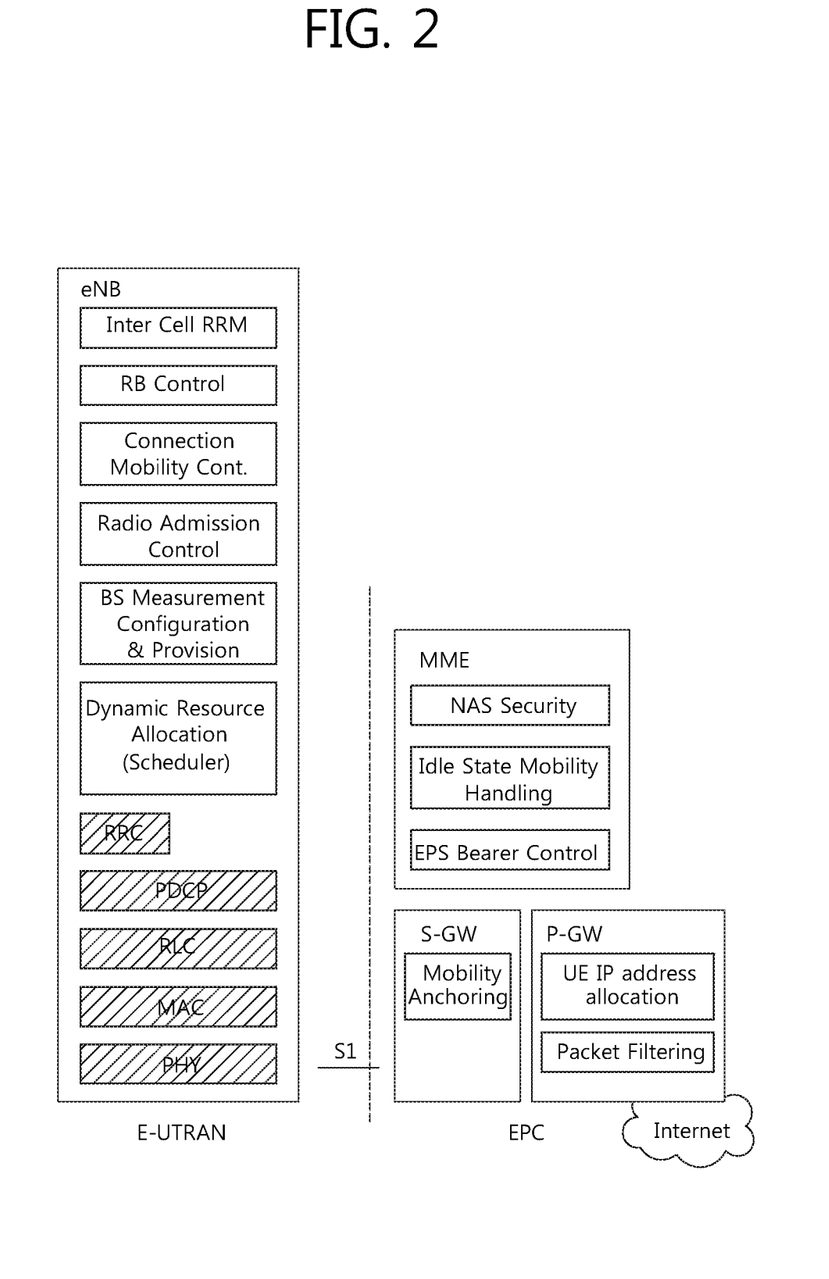
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
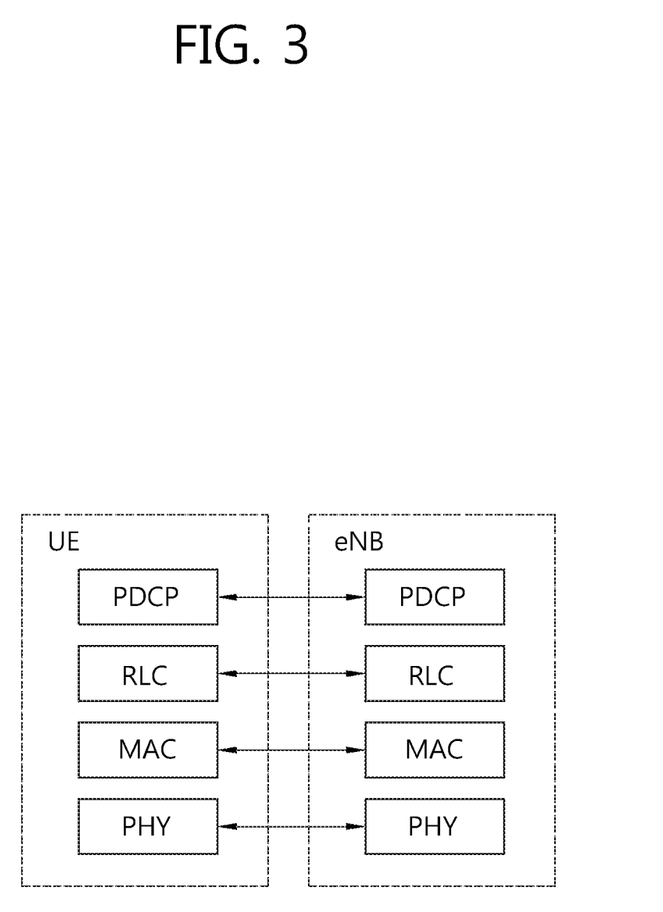
FIG. 3 shows a block diagram of a user plane protocol stack of an LTE system.
Figure 4:
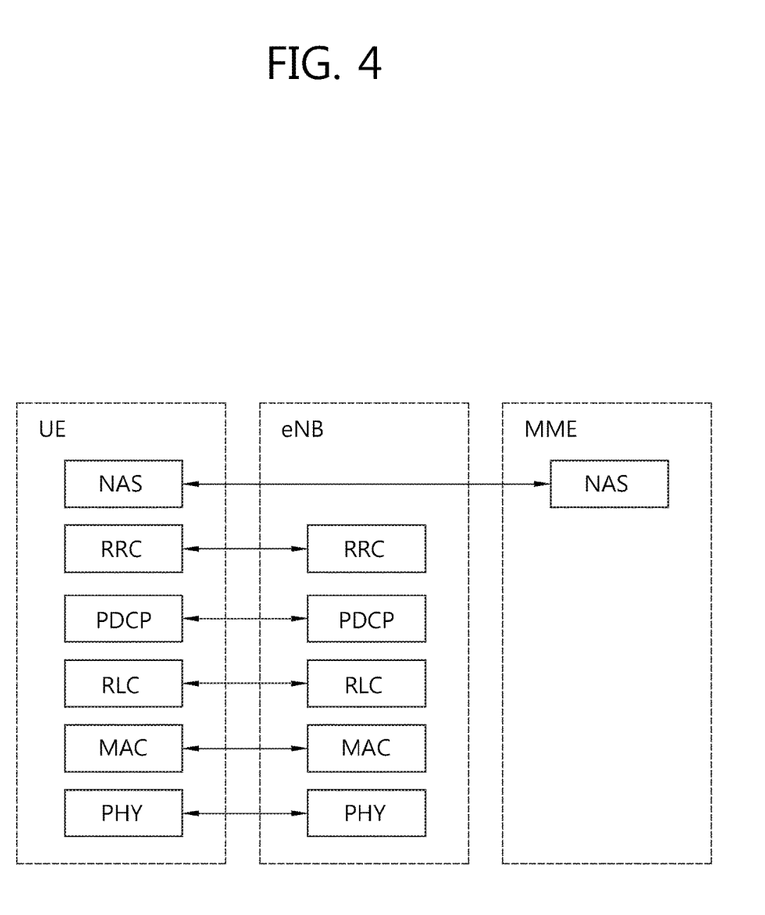
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
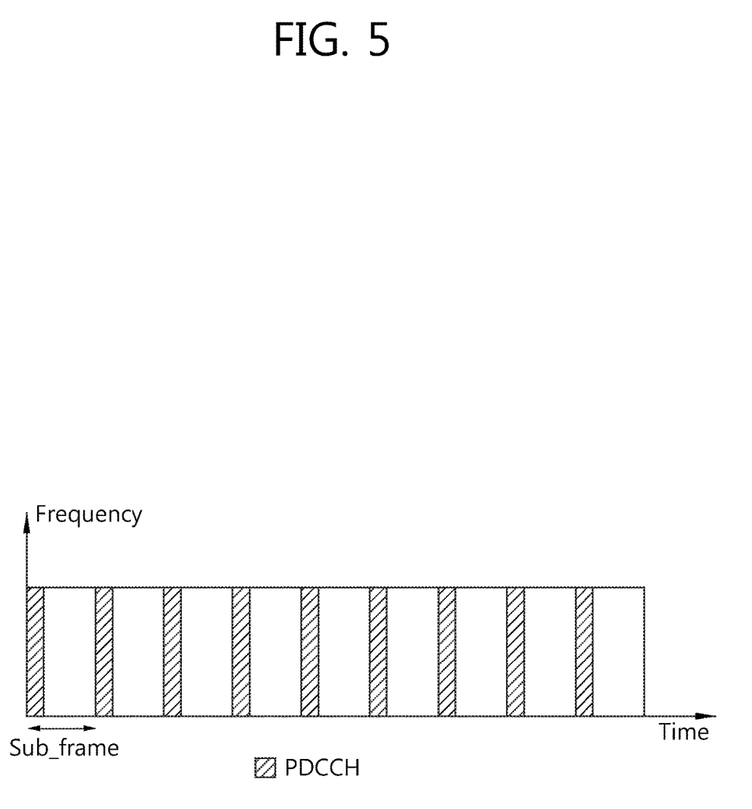
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Since rel-8, 3GPP has standardized access network discovery and selection functions (ANDSF), which is for interworking between 3GPP access network and non-3GPP access network (e.g. wireless local area network (WLAN)). The ANDSF management object (MO) is used to manage inter-system mobility policy (ISMP) and inter-system routing policy (ISRP) as well as access network discovery information stored in a UE supporting provisioning of such information from an ANDSF.

The ANDSF may initiate the provision of information from the ANDSF to the UE. The relation between ISMP, ISRP and discovery information is that ISMP prioritize the access network when the UE is not capable to connect to the EPC through multiple accesses, ISRP indicate how to distribute traffic among available accesses when the UE is capable to connect to the EPC through multiple accesses (i.e. the UE is configured for IP flow mobility (IFOM), multiple access connectivity (MAPCON), non-seamless WLAN offload or any combination of these capabilities), while discovery information provide further information for the UE to access the access network defined in the ISMP or in the ISRP. The MO defines validity areas, position of the UE and availability of access networks in terms of geographical coordinates. The UE is not required to switch on all UE's supported radios for deducing its location for ANDSF purposes or for evaluating the validity area condition of a policy or discovery information. The UE shall discard any node which is a child of the ANDSF MO root node and is not supported by the UE. The ANDSF server shall discard any node which is a child of the ANDSF MO root node and is not supported by the ANDSF server.

In addition to ANDSF, additional policy may be specified in RAN specification for interworking between 3GPP access network (e.g. E-UTRAN) and non-3GPP access network (e.g. WLAN). The additional policy for interworking between 3GPP access network and non-3GPP access network may be referred to as RAN rule. Hereinafter, interworking between 3GPP access network (e.g. E-UTRAN) and non-3GPP access network (e.g. WLAN) may be referred to as traffic steering.

Access network selection and traffic steering between E-UTRAN and WLAN is described. The mechanism to support traffic steering between E-UTRAN and WLAN may be described. Specifically, E-UTRAN assisted UE based bi-directional traffic steering between E-UTRAN and WLAN for UEs in RRC_IDLE and RRC_CONNECTED may be supported.

E-UTRAN provides assistance parameters via broadcast and dedicated RRC signaling to the UE. The RAN assistance parameters may include E-UTRAN signal strength and quality thresholds, WLAN channel utilization thresholds, WLAN backhaul data rate thresholds, WLAN signal strength and quality thresholds and offload preference indicator (OPI). E-UTRAN can also provide a list of WLAN identifiers to the UE via broadcast signaling. WLANs provided by E-UTRAN may include an associated priority. The UE uses the RAN assistance parameters in the evaluation of traffic steering rules or access network discovery and selection function (ANDSF) policies, for traffic steering decisions between E-UTRAN and WLAN. The OPI is only used in ANDSF policies. WLAN identifiers are only used in traffic steering rules.

If the UE is provisioned with ANDSF policies it shall forward the received RAN assistance parameters to upper layers, otherwise it shall use them in the traffic steering rules. The traffic steering rules are applied only to the WLANs of which identifiers are provided by the E-UTRAN. The UE in RRC_CONNECTED shall apply the parameters obtained via dedicated signaling if such have been received from the serving cell. Otherwise, the UE shall apply the parameters obtained via broadcast signaling. The UE in RRC_IDLE shall keep and apply the parameters obtained via dedicated signaling, until cell reselection or a timer has expired since the UE entered RRC_IDLE upon which the UE shall apply the parameters obtained via broadcast signaling. In the case of RAN sharing, each PLMN sharing the RAN can provide independent sets of RAN assistance parameters.

The UE indicates to upper layers when (and for which WLAN identifiers along with associated priorities, if any) access network selection and traffic steering rules are fulfilled. The selection among WLAN APs that fulfil the access network selection and traffic steering rules is up to UE implementation. When the UE applies the access network selection and traffic steering rules, it performs traffic steering between E-UTRAN WLAN with APN granularity.

For access network selection and traffic steering between E-UTRAN and WLAN, RAN assistance parameters may be provided. When the UE is in RRC_IDLE, RAN assistance parameters may be provided to the UE in SystemInformationBlockType17 or in the RRCConnectionReconfiguration message. RAN assistance parameters received in SystemInformationBlockType17 are valid only if the UE is camped on a suitable cell. The UE shall discard the RAN assistance parameters upon cell reselection. Upon T350 expiry, the UE shall discard the RAN assistance parameters received in the RRCConnectionReconfiguration message and apply the RAN assistance parameters received in SystemInformationBlockType17. The UE shall forward to the upper layers the current RAN assistance parameters either when new parameters are received or when parameters are discarded.

Access network selection and traffic steering rules are only applicable for a WLAN for which an identifier has been signaled to the UE by the E-UTRAN and the UE is capable of traffic steering between E-UTRAN and WLAN.

The UE shall indicate to the upper layers when and for which WLAN identifiers the following conditions 1 and 2 for steering traffic from E-UTRAN to WLAN are satisfied for a time interval $Tsteering_{WLAN}$. $Tsteering_{WLAN}$ specifies the timer value during which the rules should be fulfilled before starting traffic steering between E-UTRAN and WLAN. WLAN identifiers may be service set IDs (SSIDs), basic service set IDs (BSSIDs) or homogeneous extended service set IDs (HESSIDs).

1. In the E-UTRAN serving cell:
RSRPmeas<$Thresh_{ServingOffloadWLAN,\ LowP}$; or
RSRQmeas<$Thresh_{ServingOffloadWLAN,\ LowQ}$;
2. In the target WLAN:
ChannelUtilizationWLAN<$Thresh_{ChUtilWLAN,\ Low}$; and
BackhaulRateDlWLAN>$Thresh_{BackhRateDLWLAN,\ High}$; and
BackhaulRateUlWLAN>$Thresh_{BackhRateULWLAN,\ High}$; and
RCPI>$Thresh_{RCPIWLAN,\ High}$; and
RSNI>$Thresh_{RSNIWLAN,\ High}$;

In the above conditions, RSRPmeas is Qrxlevmeas in RRC_IDLE, which is measured cell RX level value, and primary cell (PCell) reference signal received power (RSRP) in RRC_CONNECTED. RSRQmeas is Qqualmeas in RRC_IDLE, which is measured cell quality value, and PCell reference signal received quality (RSRQ) In RRC_CONNECTED. ChannelUtilizationWLAN is WLAN channel utilization. BackhaulRateDlWLAN is WLAN backhaul available DL bandwidth. BackhaulRateUlWLAN is WLAN backhaul available UL bandwidth. RCPI is WLAN received channel power indicator. RSNI is WLAN received signal to noise indicator. $Thresh_{ServingOffloadWLAN,\, LowP}$ specifies the RSRP threshold (in dBm) used by the UE for traffic steering to WLAN. $Thresh_{ServingOffloadWLAN,\, LowQ}$ specifies the RSRQ threshold (in dB) used by the UE for traffic steering to WLAN. $Thresh_{ChUtilWLAN,\, Low}$ specifies the WLAN channel utilization (BSS load) threshold used by the UE for traffic steering to WLAN. $Thresh_{BackhRateDLWLAN,\, High}$ specifies the backhaul available downlink bandwidth threshold used by the UE for traffic steering to WLAN. $Thresh_{BackhRateULWLAN,\, High}$ specifies the backhaul available uplink bandwidth threshold used by the UE for traffic steering to WLAN. The above parameters for access network selection and traffic steering between 3GPP and WLAN may be broadcast in system information and are read from the E-UTRAN serving cell. $Thresh_{RCPIWLAN,\, High}$ specifies the RCPI threshold used by the UE for traffic steering to WLAN. $Thresh_{RSNIWLAN,\, High}$ specifies the RSNI threshold used by the UE for traffic steering to WLAN.

The UE shall exclude the evaluation of a measurement for which a threshold has not been provided. The UE shall evaluate the E-UTRAN conditions on PCell only. If not all metrics related to the provided thresholds can be acquired for a WLAN, the UE shall exclude that WLAN from the evaluation of the above rule.

Along with the indication, the UE shall indicate to the upper layers the priorities for the WLAN identifiers if provided by the E-UTRAN.

The UE shall indicate to the upper layers when the following conditions 3 or 4 for steering traffic from WLAN to E-UTRAN are satisfied for a time interval $Tsteering_{WLAN}$:
3. In the source WLAN:
ChannelUtilizationWLAN>$Thresh_{ChUtilWLAN,\, High}$; or
BackhaulRateDlWLAN<$Thresh_{BackhRateDLWLAN,\, Low}$; or
BackhaulRateUlWLAN<$Thresh_{BackhRateULWLAN,\, Low}$; or
RCPI<$Thresh_{RCPIWLAN,\, Low}$; or
RSNI<$Thresh_{RSNIWLAN,\, Low}$;
4. In the target E-UTRAN cell:
RSRPmeas>$Thresh_{ServingOffloadWLAN,\, HighP}$; and
RSRQmeas>$Thresh_{ServingOffloadWLAN,\, HighQ}$;

In the above conditions, $Thresh_{ChUtilWLAN,\, High}$ specifies the WLAN channel utilization (BSS load) threshold used by the UE for traffic steering to E-UTRAN. $Thresh_{BackhRateDLWLAN,\, Low}$ specifies the backhaul available downlink bandwidth threshold used by the UE for traffic steering to E-UTRAN. $Thresh_{BackhRateULWLAN,\, Low}$ specifies the backhaul available uplink bandwidth threshold used by the UE for traffic steering to E-UTRAN. $Thresh_{RCPIWLAN,\, Low}$ specifies the RCPI threshold used by the UE for traffic steering to E-UTRAN. $Thresh_{RSNIWLAN,\, Low}$ specifies the RSNI threshold used by the UE for traffic steering to E-UTRAN. $Thresh_{ServingOffloadWLAN,\, HighP}$ specifies the RSRP threshold (in dBm) used by the UE for traffic steering to E-UTRAN. $Thresh_{ServingOffloadWLAN,\, HighQ}$ specifies the RSRQ threshold (in dB) used by the UE for traffic steering to E-UTRAN.

The UE shall exclude the evaluation of a measurement for which a threshold has not been provided. The UE shall evaluate the E-UTRAN conditions on PCell only. If not all metrics related to the provided thresholds can be acquired for a WLAN, the UE shall exclude that WLAN from the evaluation of the above rule.

Overall architecture and network interface for dual connectivity (DC) is described. It may be referred to 3GPP TR 36.842 V12.0.0 (2013-12). The E-UTRAN supports dual connectivity operation whereby a multiple RX/TX UE in RRC_CONNECTED is configured to utilize radio resources provided by two distinct schedulers, located in two eNBs connected via a non-ideal backhaul over the X2 interface. The overall E-UTRAN architecture described in FIG. 1 is applicable for dual connectivity as well. Two different roles may be assumed to eNBs involved in dual connectivity for a certain UE: an eNB may either act as a master eNB (MeNB) or as a secondary eNB (SeNB). The MeNB is the eNB which terminates at least S1-MME in dual connectivity. The SeNB is the eNB that is providing additional radio resources for the UE but is not the MeNB in dual connectivity. In dual connectivity a UE is connected to one MeNB and one SeNB.

Figure 6:
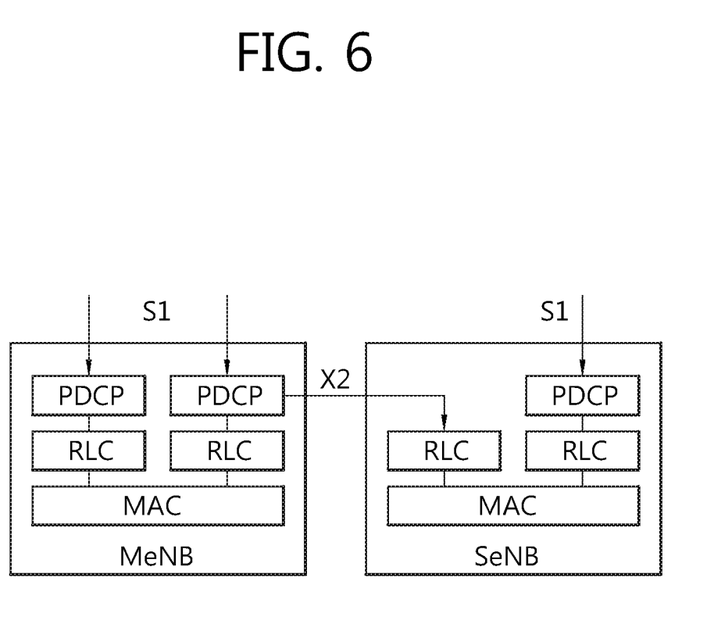
FIG. 6 shows radio protocol architecture for dual connectivity.

FIG. 6 shows radio protocol architecture for dual connectivity. In DC, the radio protocol architecture that a particular bearer uses depends on how the bearer is setup. Three alternatives exist, master cell group (MCG) bearer, secondary cell group (SCG) bearer and split bearer. Referring to FIG. 6, those three alternatives are depicted, i.e. in order of the MCG bearer, split bearer and SCG bearer from left to right. The MCG bearer is a bearer whose radio protocols are only located in the MeNB to use MeNB resources only in dual connectivity. The SCG bearer is a bearer whose radio protocols are only located in the SeNB to use SeNB resources in dual connectivity. The split bearer is a bearer whose radio protocols are located in both the MeNB and the SeNB to use both MeNB and SeNB resources in dual connectivity. Signaling radio bearers (SRBs) are always of the MCG bearer and therefore only use the radio resources provided by the MeNB.

In DC, the configured set of serving cells for a UE consists of two subsets: the MCG containing the serving cells of the MeNB, and the SCG containing the serving cells of the SeNB. The MCG is a group of serving cells associated with the MeNB, comprising of the primary cell (PCell) and optionally one or more secondary cells (SCells) in dual connectivity. The SCG is a group of serving cells associated with the SeNB, comprising of primary SCell (PSCell) and optionally one or more SCells in dual connectivity. DC may also be described as having at least one bearer configured to use radio resources provided by the SeNB.

For SCG, the following principles are applied:
At least one cell in SCG has a configured UL and one of them is configured with physical uplink control channel (PUCCH) resources;
Upon detection of a physical layer problem or a random access problem on PSCell, or the maximum number of RLC retransmissions has been reached associated with the SCG, RRC connection re-establishment procedure is not triggered/All UL transmissions towards all cells of the SCG are stopped/The UE is not required to monitor PDCCH on any cell of the SCG;
MeNB is informed by the UE of SCG failure type.
For split bearer, the data transfer over the MeNB is maintained.
Only the RLC acknowledged mode (AM) bearer can be configured for the split bearer;
Like PCell, PSCell cannot be de-activated.

With respect to the interaction between MeNB and SeNB, the following principles are applied:
The MeNB maintains the radio resource management (RRM) measurement configuration of the UE and may, e.g., based on received measurement reports or traffic conditions or bearer types, decide to ask an SeNB to provide additional resources (serving cells) for a UE.
Upon receiving the request from the MeNB, a SeNB may create the container that will result in the configuration of additional serving cells for the UE (or decide that it has no resource available to do so).

For UE capability coordination, the MeNB provides (part of) the AS-configuration and the UE capabilities to the SeNB.

The MeNB and the SeNB exchange information about UE configuration by means of RRC containers (inter-node messages) carried in X2 messages.

The SeNB may initiate a reconfiguration of its existing serving cells (e.g., PUCCH towards the SeNB).

The SeNB decides PSCell within the SCG.

The MeNB does not change the content of the RRC configuration provided by the SeNB.

In the case of the SCG addition and SCG SCell addition, the MeNB may provide the latest measurement results for the SCG cell(s).

When adding a new SCG SCell, dedicated RRC signalling is used for sending all required system information of the cell as for CA, except for the SFN acquired from MIB of the PSCell of SCG. For split bearer, UE is configured over which link the UE transmits UL PDCP PDU.

Figure 7:
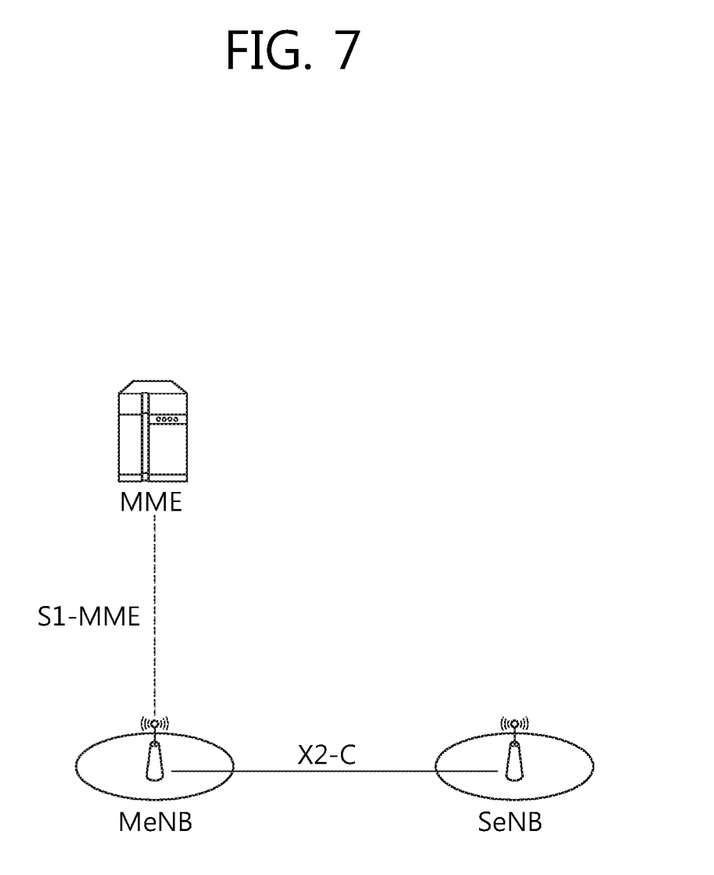
FIG. 7 shows C-plane connectivity of eNBs involved in dual connectivity for a certain UE.
Figure 9:
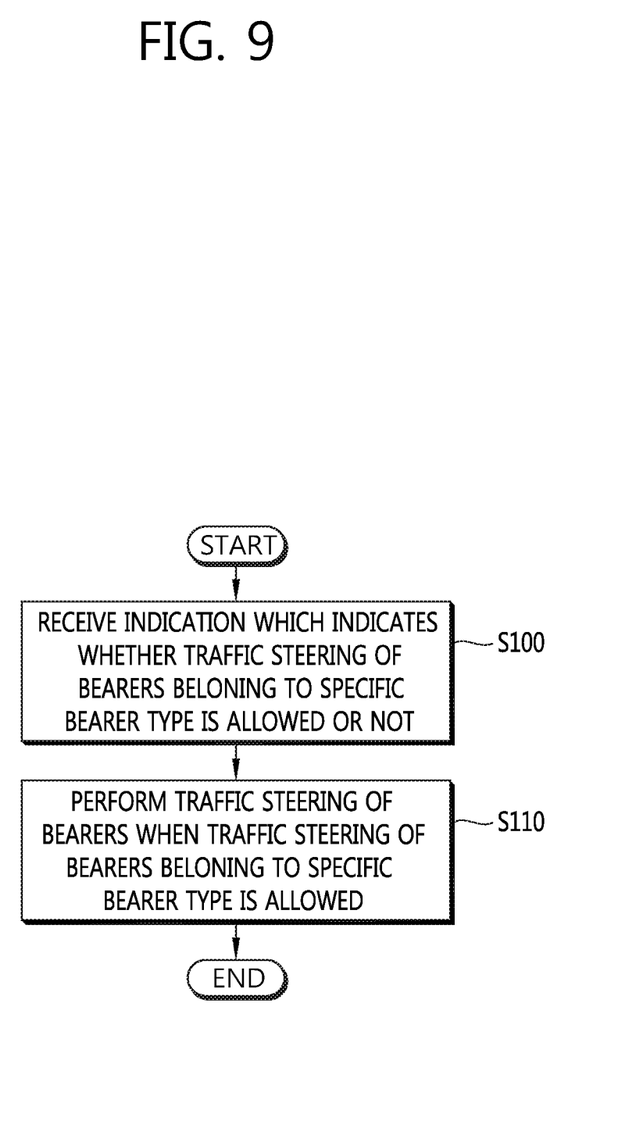
FIG. 9 shows an example of a method for performing traffic steering according to an embodiment of the present invention.

FIG. 7 shows C-plane connectivity of eNBs involved in dual connectivity for a certain UE. Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling. Referring to FIG. 9, the MeNB is C-plane connected to the MME via S1-MME, the MeNB and the SeNB are interconnected via X2-C.

Figure 8:
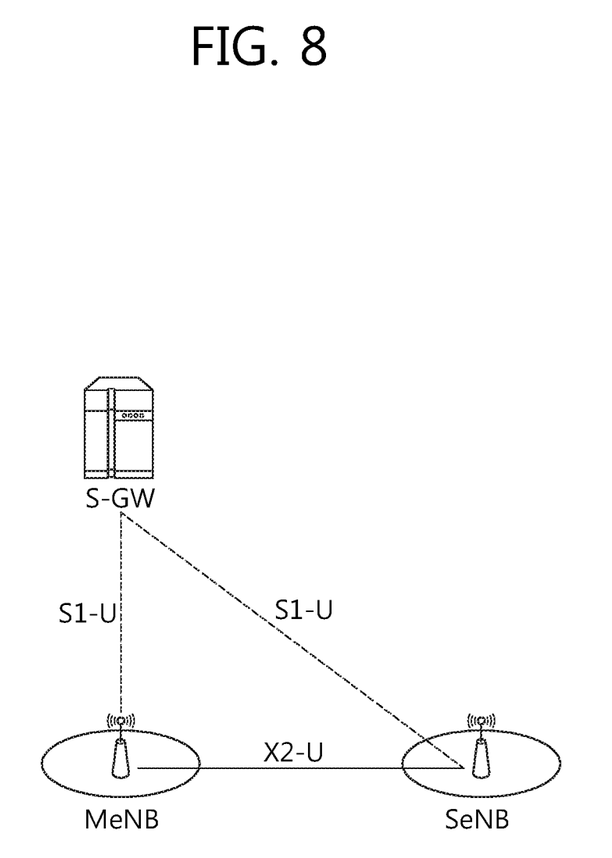
FIG. 8 shows U-plane connectivity of eNBs involved in dual connectivity for a certain UE.

FIG. 8 shows U-plane connectivity of eNBs involved in dual connectivity for a certain UE. U-plane connectivity depends on the bearer option configured. For MCG bearers, the MeNB is U-plane connected to the S-GW via S1-U, the SeNB is not involved in the transport of user plane data. For split bearers, the MeNB is U-plane connected to the S-GW via S1-U and in addition, the MeNB and the SeNB are interconnected via X2-U. For SCG bearers, the SeNB is directly connected with the S-GW via S1-U. If only MCG and split bearers are configured, there is no S1-U termination in the SeNB.

As describe above, the UE compares the radio condition of 3GPP serving cell with the threshold for traffic steering to/from WLAN. In case of non-CA capable UE and non-DC capable UE, the UE has only one serving cell so that it is clear of which serving cell the UE should compare the radio condition with the threshold for traffic steering to/from WLAN. However, the UE may have multiple serving cells due to CA and/or DC. A CA capable UE may have PCell and SCell and a DC capable UE may have serving cells in MeNB and SeNB. It is unclear of which serving cell the UE should compare the radio condition with the threshold for traffic steering, and from which serving cell the UE should steer the traffic to the WLAN. Further, when different types of bearer are configured for DC, how to steer traffic according to the type of bearers may be a problem, specifically for split bearer.

Hereinafter, a method for performing traffic steering between 3GPP and WLAN for dual connectivity according to an embodiment of the present invention is described.

According to an embodiment of the present invention, traffic steering may be permitted per bearer type, specifically for split bearer. Hereinafter, it is assumed that a UE in RRC_CONNECTED is configured with one or more serving cells other than PCell of MeNB (e.g. SCells of MeNB, PSCell of SeNB, SCells of SeNB). In the description below, unless explicitly stated, the PCell means the PCell of the MeNB. The PSCell means the PCell of the SeNB.

FIG. 9 shows an example of a method for performing traffic steering according to an embodiment of the present invention.

In step S100, the UE receives an indication which indicates whether traffic steering of bearers belonging to a specific bearer type is allowed or not. The traffic steering may include traffic steering from 3GPP access network (e.g. 3GPP LTE) to non-3GPP access network (e.g. WLAN) or traffic steering from non-3GPP access network (e.g. WLAN) to 3GPP access network (e.g. 3GPP LTE). The specific bearer type may include at least one of MCG bearer, SCG bearer, or split bearer.

The indication may consist of bitmap. Each bit of the bitmap may indicate whether the traffic steering of bearers belonging to MCG bearer, SCG bearer or split bearer is allowed or not. For example, the first bit, the second bit, and third bit of the bitmap may respectively indicate whether the traffic steering of bearers belonging to MCG bearer, SCG bearer or split bearer is allowed or not, respectively. Alternatively, the indication may only indicate whether the traffic steering of bearers belonging to the split bearer is allowed or not. Alternatively, the indication may only indicate whether the traffic steering of bearers belonging to the SCG bearer is allowed or not. Alternatively, the indication may only indicate the bearer type which should be kept in 3GPP access network.

In step S110, the UE performs traffic steering of bearers when traffic steering of bearers belonging to the specific bearer type is allowed. Depending on the bearer type (i.e. MCG bearer, SCG bearer, split bearer), traffic steering condition may be different as described below. If traffic steering of the corresponding bearer is allowed by the network, the UE evaluates the 3GPP related condition in interworking policy.

First, traffic steering of the corresponding bearer(s) from the 3GPP access network to the non-3GPP access network is described. For MCG bearer(s), if 3GPP related conditions on PCell are met, or if 3GPP related conditions on the cell(s) corresponding to the corresponding bearer(s) are met, the UE may steer the traffic of the corresponding bearer(s) to the non-3GPP access network. For SCG bearer(s), if 3GPP related conditions on PCell are met, or if 3GPP related conditions on the PCell and/or PSCell are met, or if 3GPP related conditions on the PSCell are met, or if 3GPP related conditions on the cell(s) corresponding to the corresponding bearer(s) are met, the UE may steer the traffic of the corresponding bearer(s) to the non-3GPP access network. For split bearer(s), if 3GPP related conditions on the PCell are met, or if 3GPP related conditions on the PCell and/or PSCell are met, or if 3GPP related conditions on the PSCell are met, or if 3GPP related conditions on both/either cell(s) of the MeNB and SeNB corresponding to the bearer(s) are met, the UE may steer the traffic of the corresponding bearer(s) to the non-3GPP access network.

Second, traffic steering of the corresponding bearer(s) from non-3GPP access network to the 3GPP access network is described. For MCG bearer(s) (i.e. traffic was handled by the MCG bearer before offloading to the non-3GPP access network), if 3GPP related conditions on the PCell are met, or if 3GPP related conditions on the cell(s) corresponding to the corresponding bearer(s) are met, the UE may steer the traffic of the corresponding bearer(s) to the MCG bearer(s). For SCG bearer(s) (i.e. traffic was handled by the SCG bearer(s) before offloading to the non-3GPP access network), if 3GPP related conditions on the PCell are met, or if 3GPP related conditions on the PCell and/or PSCell (if SCG is configured) are met, or if 3GPP related conditions on the PSCell are met if SCG is configured, or if 3GPP related conditions on the cell(s) corresponding to the corresponding bearer(s) are met, the UE may steer the traffic of the corresponding bearer(s) to the MCG bearer(s), and may further steer the traffic of the corresponding bearer(s) to the SCG bearer(s), if the SCG bearer(s) is still configured. For split bearer(s) (i.e. traffic was handled by the MCG bearer(s) and SCG bearer(s) before offloading to the non-3GPP access network), if 3GPP related conditions on the PCell are met, or if 3GPP related conditions on the PCell and/or PSCell (if SCG is configured) are met, or if 3GPP related conditions on the PSCell are met if SCG is configured, or If 3GPP related conditions on both/either cell(s) of the MeNB and SeNB (if SCG is configured) corresponding to the corresponding bearer(s) are met, the UE may steer the traffic of the corresponding bearer(s) to the MCG bearer(s), and may further steer the traffic of the corresponding bearer(s) to the MCG bearer(s) and the SCG bearer(s), if the SCG bearer(s) is still configured.

For evaluating the 3GPP related condition described above for traffic steering of bearers, the network may provide RAN assistance information to the UE via dedicated/broadcast signaling. The RAN assistance information may be separate RAN assistance information for each allowed serving cell or serving cell type which includes the cell identifier of each allowed serving cell or serving cell type. Alternatively, the RAN assistance information may be one common RAN assistance information for all of allowed serving cells or all of allowed serving cell types which includes the cell identifier of all of allowed serving cells or all of allowed serving cell types. Alternatively, the RAN assistance information may be a set of RAN assistance information and linkage between RAN assistance information and the cell identifier of the serving cell (or serving cell type) to which the RAN assistance information is applied may be further provided. Alternatively, the RAN assistance information may be separate RAN assistance information for each bearer type.

The RAN assistance information may include thresholds regarding 3GPP related condition as well as non-3GPP related condition, which are used in interworking policy described below. Thresholds regarding 3GPP related condition may include thresholds regarding RSRP, RSRQ, load of 3GPP access network. (e.g. Threshold_RSRP_offload, Threshold_RSRQ_offload, Threshold_Load_offload, Threshold_RSRP_onload, Threshold_RSRQ_onload and Threshold_Load_onload). Threshold_RSRP_offload may be $Thresh_{ServingOffloadWLAN, LowP}$ described above. Threshold_RSRQ_offload may be $Thresh_{ServingOffloadWLAN, LowQ}$ described above. Threshold_RSRP_onload may be $Thresh_{ServingOffloadWLAN, HighP}$ described above. Threshold_RSRQ_onload may be $Thresh_{ServingOffloadWLAN, HighQ}$ described above. Thresholds regarding non-3GPP related condition may include thresholds regarding received signal strength indicator (RSSI), backhaul data rate, channel utilization, throughput.

Figure 10:
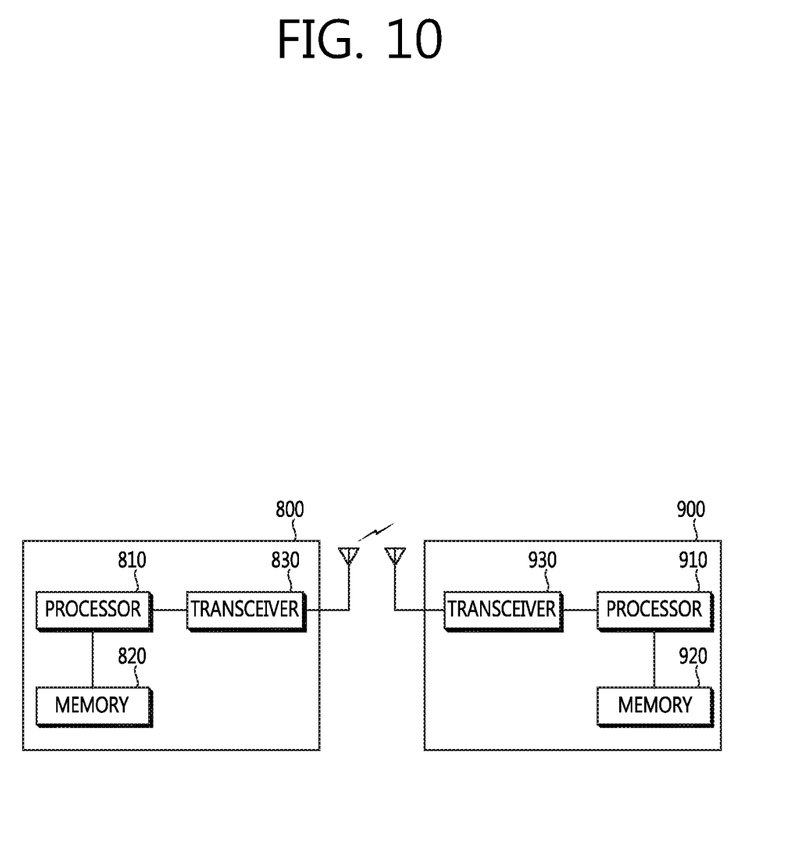
FIG. 10 shows a wireless communication system to implement an embodiment of the present invention.

Interworking policy may mean RAN rule specified in 3GPP TS 36.304 or ANDSF. The example rule regarding 3GPP related condition may as follows. For traffic steering of the corresponding bearer from the 3GPP network to the non-3GPP access network RSRP<Threshold_RSRP_offload; and/o
RSRQ<Threshold_RSRQ_offload; and/or
Load of 3GPP>Threshold_Load_offload For traffic steering of the corresponding bearer from the non-3GPP access network to the 3GPP access network RSRP>Threshold_RSRP_onload; and/or
RSRQ>Threshold_RSRQ_onload; and/or
Load of 3GPP<Threshold_Load_onload FIG. 10 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for performing, by a user equipment (UE), traffic steering in a wireless communication system, the method comprising:

receiving information on a threshold for a specific bearer type;

evaluating qualities of bearers which belong to the specific bearer type; and performing traffic steering of the bearers from a first radio access network (RAN) to a second RAN by comparing the evaluated qualities with the threshold, wherein the specific bearer type indicates a split bearer.

2. The method of claim 1, wherein the first RAN and the second RAN are one of a 3rd generation partnership project (3GPP) access network and a non-3GPP access network, respectively.

3. The method of claim 2, wherein the non-3GPP access network includes a wireless local area network (WLAN).

4. The method of claim 1, wherein the UE is connected to both a master evolved NodeB (MeNB) and a secondary eNB (SeNB) in dual connectivity.

5. The method of claim 1, wherein performing traffic steering of bearers comprises evaluating a 3GPP related condition according to the specific bearer type.

6. The method of claim 5, wherein the first RAN is a 3GPP access network and the second RAN is a non-3GPP access network.

7. A user equipment (UE) comprising:

a memory;

a transceiver; and a processor coupled to the memory and the transceiver, and configured to:

control the transceiver to receive information on a threshold for a specific bearer type regarding a first access network system;

evaluate qualities of bearers which belong to the specific bearer type; and perform traffic steering of the bearers to a second access network system by comparing the evaluated qualities with the threshold, wherein the specific bearer type indicates a split bearer.

* * * * *